Figure 1:
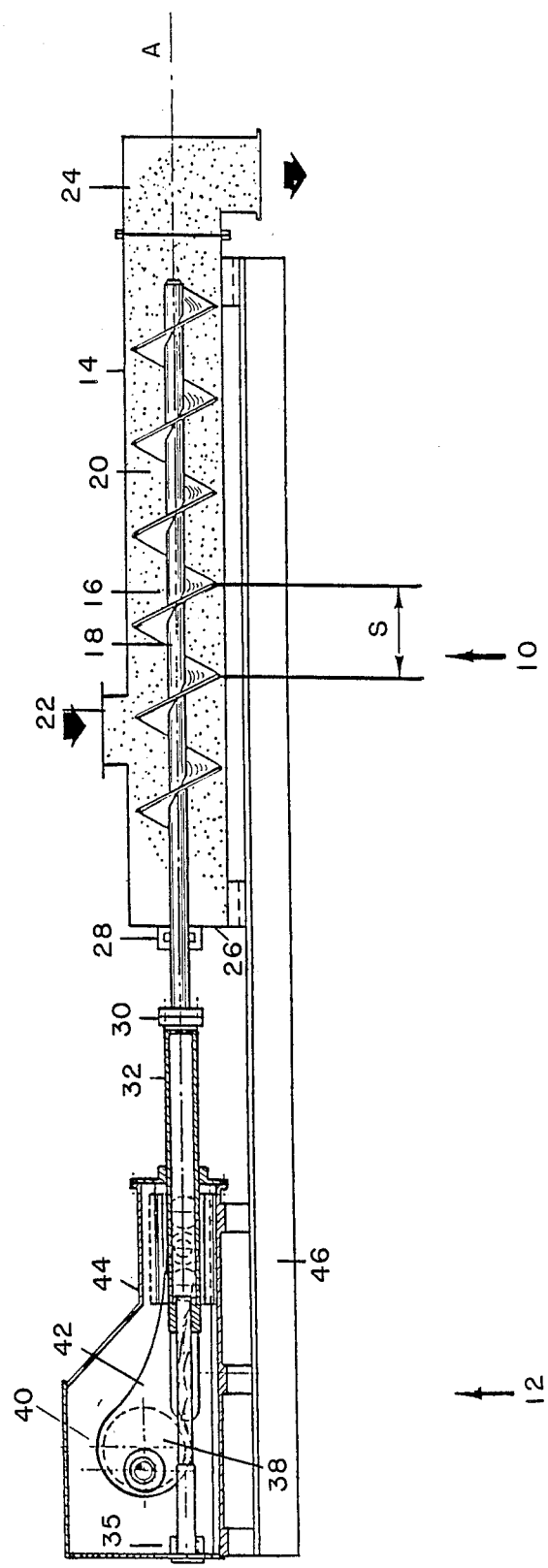

United States Patent [19]

Merz

[11] Patent Number: 4,826,361
[45] Date of Patent: May 2, 1989

[54] CONVEYING DEVICE FOR TRANSPORTATION OF FLOWABLE MATERIALS

[75] Inventor: Walter Merz, Küsnacht, Switzerland

[73] Assignee: Swiss Aluminium Ltd., Chippis, Switzerland

[21] Appl. No.: 893,329

[22] PCT Filed: Nov. 26, 1985

[86] PCT No.: PCT/CH85/00167

§ 371 Date: Jul. 21, 1986

§ 102(e) Date: Jul. 21, 1986

[87] PCT Pub. No.: WO86/03180

PCT Pub. Date: Jun. 5, 1986

[30] Foreign Application Priority Data

Nov. 26, 1984 [CH] Switzerland ............. 5624/84

[51] Int. Cl.$^4$ ............................................. B65G 53/08
[52] U.S. Cl. ........................................ 406/60; 406/73; 198/674
[58] Field of Search ................................. 406/51–53, 406/55, 56, 60, 61, 73, 74, 76, 57; 198/674–676

[56] References Cited

U.S. PATENT DOCUMENTS

| | | |
|---|---|---|
| 2,260,824 | 10/1941 | Bliss et al. |
| 2,541,742 | 2/1951 | Booth .................. 198/674 X |
| 3,310,836 | 3/1967 | Nichols ................ 198/676 |
| 3,975,058 | 8/1976 | York .................... 406/60 |
| 4,286,935 | 9/1981 | Okuno et al. ......... 406/50 X |
| 4,391,561 | 6/1983 | Smith et al. |
| 4,473,327 | 9/1984 | Delfs ................... 406/60 |

FOREIGN PATENT DOCUMENTS

| | | |
|---|---|---|
| 1085812 | 7/1960 | Fed. Rep. of Germany . |
| 1434276 | 2/1966 | France . |
| 591326 | 9/1977 | Switzerland . |
| 1142836 | 2/1969 | United Kingdom . |

*Primary Examiner*—Sherman D. Basinger
*Assistant Examiner*—Paul E. Salmon
*Attorney, Agent, or Firm*—Bachman & LaPointe

[57] ABSTRACT

A device for the transportation of flowable material in pulverulent, granular, lump, granulated or pasty form in a feed pipe comprises a coaxial endless feeder screw which is rotatable in the forward or reverse direction and a drive mechanism for driving said screw. The drive mechanism enables one to obtain a feed motion without rotation and a rearward motion with a forced, regular rotation of the endless screw so that the material to be transported remains axially stationary during the rearward motion. Owing to the dense column of material to be transported the bearings may be suppressed; if they are provided, they will have to be arranged outside the conveying stock. The endless screw is designed as a single piece screw and the distance between the screw and the feed pipe is slightly bigger than the average size of the grains or lumps of material to be conveyed. The device is preferably used for the supply of pneumatic or hydraulic conveyors.

8 Claims, 4 Drawing Sheets

CONVEYING DEVICE FOR TRANSPORTATION OF FLOWABLE MATERIALS

The invention relates to a device for the transportation of flowable material in powder, particulate, lump, granular or pasty form in a feed pipe by means of a coaxial feeder screw and means for driving said screw which can be moved parallel to its axis in the forward and reverse direction. The forward movement is rotation-free, the return movement is accompanied by a forced rotational movement, as a result of which the material to be transported does not move in the axial direction on the return stroke.

In screw conveyors the impeller is the surface of a screw which is made of sheet, strip steel, or is machined out of solid material (seldom cast material), which is rotated about its axis and pushes the material to be transported forwards in a trough or pipe. Screw conveyors are described for example in the Handbook for Machine Construction by "Dubbel" (1981), pages 1154 and 1155, and also in the literature issued by numerous companies.

Conventional screw conveyors exhibit several disadvantages:

The pipe must not be filled completely, but only approximatively half-filled, otherwise blockage occurs. This means that the conveyance capacity per unit of cross-section is markedly reduced. Further, no difference i n pressure may be applied over the only half-filled screw conveyor.

The forward motion in the screw conveyor can only take place via relative movement between the screw blade and the contents.

Because of the small distance between the screw and the pipe wall, granules of the material being transported are broken.

The material to be transported is continually turned over.

The screw conveyor can be fed only by means of a measured feed facility as it may be no more than half-full.

The German Pat. No. 953 956 describes a screw conveyor for transporting loose material in a stream of counter-flowing fluid. The screw which is mounted such that it can rotate and be moved longitudinally is moved forwards and backwards. During the backward movement it is rotated in the sense of a forward movement of the material.

The desired, maximum possible mixing of the material and the counter flowing fluid is, according to the German Pat. No. 953 956, achieved in that:

the screw blades are interrupted, bearings are mounted in the stream of flowing material, and the trough containing the screw conveyor is not completely filled.

Described in U.S. Pat. No. 2,260,824 is likewise a screw conveyor which is mounted such that it can be rotated and moved longitudinally, and on the return movement is forceably rotated. The device is employed as equipment for feeding measured quantities.

The object of the present invention is to develop a device which is a type of screw conveyor that can be moved forwards and backwards and is forceably rotated during the return movement, said conveyor being for the transportation of flowing material, exhibiting a high feed capacity per unit cross section, requiring no measured feed facility and enabling a pressure difference to be produced over the length of the screw on application of a gaseous or liquid propellant.

This objective is achieved by way of the invention in that the feeder screw features no bearings or only bearings outside column of feed stock, the blades on the feeder screw are continuous and the distance of the feeder screw from the inner wall of the feed pipe is on all sides just larger than the average particle or lump size of the material being transported, whereupon in the presence of a pneumatic or hydraulic counter-pressure a compact, homogeneous column of material is produced.

With the feeder screw according to the invention a very dense column of material is produced; this is self-sealing over the whole length of the screw conveyor and also on being advanced in the pipe does not become loose. The counter pressure at the exit opening is usually around 6–8 bar.

The device with the feeder screw can be mounted horizontally, vertically or at any angle of choice. It is aligned automatically by the material in the feed pipe so that normally, thanks to the dense column, no bearings are necessary. If the material in the pipe does not permit selfalignment, which is rather seldom the case, the bearings are always situated outside the column of material being transported.

The friction between the particulate material and the inner wall of the feed pipe or the feeder screw is a function of the coefficients of friction, the surface area where friction occurs and the average normal pressure of the particles on the surface being rubbed.

As with known screw conveyors the conception must ensure that the material being transported is not twisted into the spiral i.e. the friction between the material and the inner wall of the feed pipe must be greater than that between the material and the rotating screw. If the feeder screw and the feed pipe are made of the same material with the same surface quality, then the ratio of the pitch of the feeder screw to its diameter is to be chosen such that in the region of this pitch the surface area of feed pipe in contact with the material is greater than that of the feeder screw. In each case the above mentioned ratio is to be chosen such that the total friction between material being transported and the pipe wall is greater than between screw blades and material. If this is so, then during the return movement the feeder screw winds back through the particulate material without the said material being pushed in the axial direction with respect to the wall of the feed pipe.

Preferably the feeder screw and the feed pipe are of steel which is abrasion-resistant and, if necessary, chemically resistant.

The coefficient of friction between the feeder screw and the material can be reduced by coating the screw with a material with good sliding properties. In this case the pitch can be reduced for the same diameter.

If a chemical or physical process should take place during transportation, then the feeder screw and the feed pipe can be designed such that it can be heated or cooled. This is achieved with the feeder screw in a known manner in that a suitable medium is introduced into the shaft or a heating rod inserted and the heat conducted from there into its blades.

The particulate material, introduced without measured feeding into the inlet port, fills the screw conveyor completely. The diameter of the feeder screw can differ according to the material to be transported. The distance between the feeder screw and the inner wall of the feed pipe is slightly larger, usefully 10–30%, than the average size of particle or lump to be transported, this so that the said material is neither jammed in the pipe nor damaged, but on the other hand forms a compact column which permits the feeder screw to run without bearings.

The shaft of the feeder screw emerging through the rear end wall of the feed pipe preferably features on its outside a seal which prevents fine particles from flowing out between the shaft and the wall.

In practice it has been found advantageous to adjust the stroke of the forwards and backwards movement of the feeder screw to 0.5-10 times the value of the pitch. Usefully the feeder screw is moved backwards and forwards with a frequency of the order of 0.5-2 sec$^{-1}$.

Depending on the application a non-return valve or slide can be fitted at the outlet from the feed pipe. A non-return valve is particularly suitable if the device according to the invention is employed to feed a conveyor pipe containing a propellant.

Special types of gears must be employed to create the composite movement of the feeder screw. These special gears are made of conventional machine elements which are capable of producing the superimposed rotational and longitudinal movements.

The, generally unproblematic, drive of the backwards and forwards movement of the feeder screw in the axial direction is achieved using electrochemical or hydraulic or pneumatic means.

The device according to the invention is suitable for transportation of flowable material of granule or lump size ranging from dust particles up to about 50 mm. The conveyance capacity depends on the size of the device and can vary between a few kilograms per hour up to about 1000 tons per hour.

For transporting flowable material over long distances the device according to the invention is not sufficient by itself; its effective range of application is at most a few meters.

Known is the transportation of solid material through gaseous propellants such as for example air, or water. For example one can make use of dense layer transportation in which the propellant is blown into the particulate material, either continuously or at regular intervals, from a parallel pipe.

In some cases it is difficult to introduce the particulate material into the stream of propellant. Decisive are uniform introduction of the particulate material with as little loss as possible, as well as low height of construction and a long service life of the feeding device.

The device according to the invention can ideally serve as a feeding facility for flowable material. The feed pipe must be so dimensioned with respect to the feeder screw that the pressure of the propellant at the entry of the material in the feeder screw amounts to only a small fraction of that in the stream of material being transported.

Preferably one attempts to have the pressure through the particulate material reduced to a value that lies below 5%, in the case of the fine grained material below 1%.

The residual pressure at material entry depends on various parameters which decisively influence the minimum length of the feed pipe:

Particle size. With coarse particulate or large size pieces of material, for example wood chips or coal, the pressure drop per meter of pipe length is much smaller than with fine grained material e.g. aluminum oxide.

Particle range. Material with various particle sizes produces a larger pressure drop per meter of pipe length than a material with uniform particle size.

Pressure of the propellant. A higher pressure, on an absolute scale, suffers a smaller reduction per meter of pipe length than does a lower pressure.

Viscosity of the propellant. This varies especially with liquid propellants.

If a counter pressure is employed, the device according to the invention must always meet the following conditions when employed as a feeding facility:

The feed pipe in the region of the feeder screw must be completely filled and air tight with the particulate material.

The friction at the inner wall of the feed pipe must, on the return movement, also be greater than the friction at the screw blades which are then at least partly under load from the particulate material.

The device according to the invention is particularly suitable as a facility for feeding material into a propellantdriven stream when bunkers or silos have to be emptied of materials which do not flow readily.

Together with the propellant media the device according to the invention acts as a pump for solid particulate material, which can then be transported with relatively low energy consumption over a horizontal, inclined or vertical distance; that distance can, without difficulty, be up to 2000 m.

The range of materials that can be transported is extremely wide. By way of example one can mention:

Aluminum industry: unloading of alumina, fluxing materials and carbonaceous products from bunkers and silos, and the transportation of these products for temporary storage to other containers; also the cleaning of scrap aluminum and transfer to melting furnaces or into the molten metal.

Coal-fired power stations: transportation of coal, slag and ashes.

Chemical industry: transportation, cooling and heating of numerous products; use in adsorption processes.

Foodstuffs industry: transportation of all kinds of grain, flour and seeds from bunkers and silos.

Wood and paper industry: transportation of wood chips, wood shavings, sawdust, fillers for paper, and chemicals for bleaching.

Fertilizer industry: transportation of crude phosphates potash and ready-for-use fertilizers.

The device according to the invention can also be employed as a facility for feeding measured quantities, as a solid state reactor, counter flow chromotograph and/or adsorption chamber.

The invention is explained in greater detail in the following with the aid of the drawings which show schematically partial vertical sections viz., FIG. 1: A conveyance device with electromechanical drive.

Figure 2:
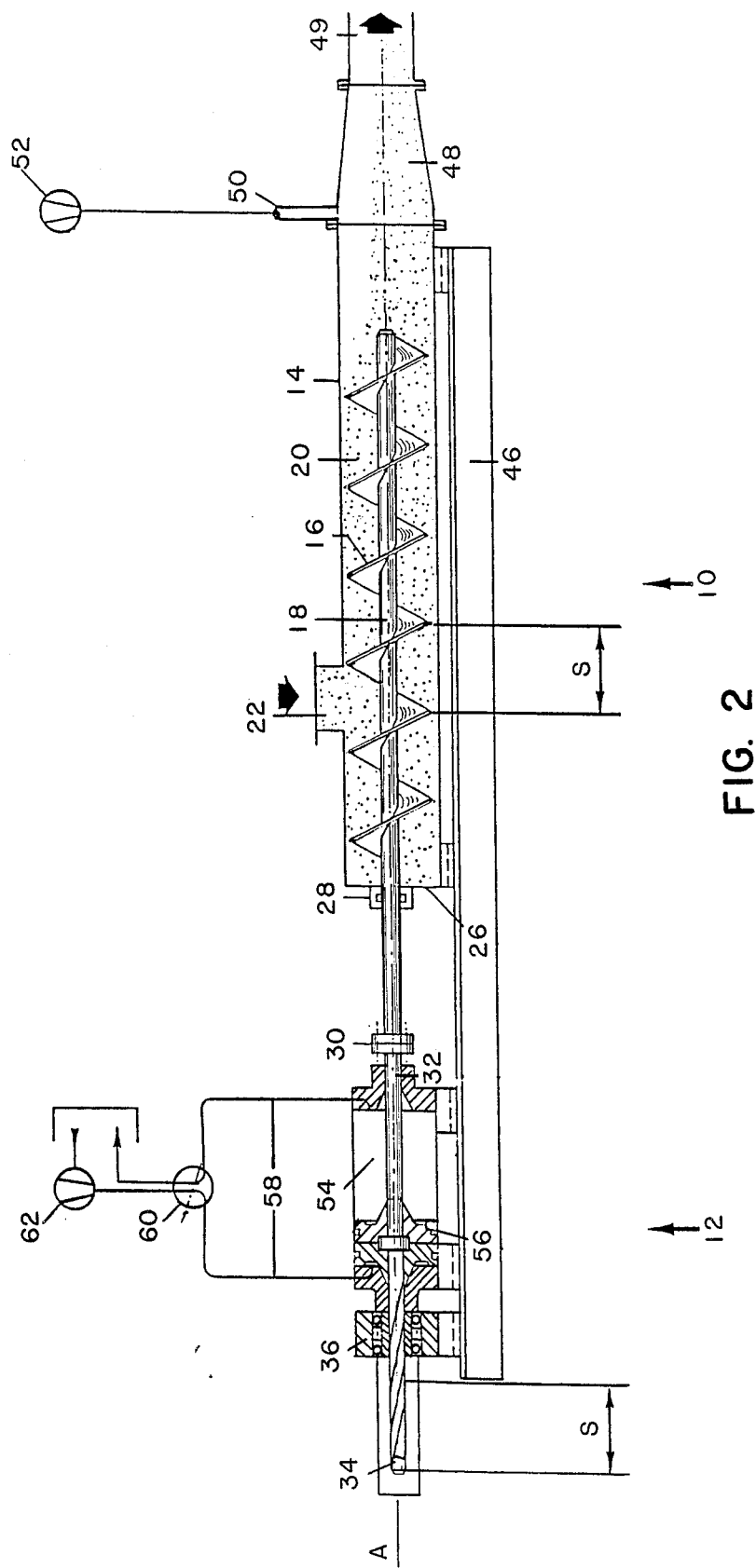

FIG. 2: A conveyance device with hydraulic drive which is employed as a self-sealing feed facility in a feeder stream.

Figure 3:
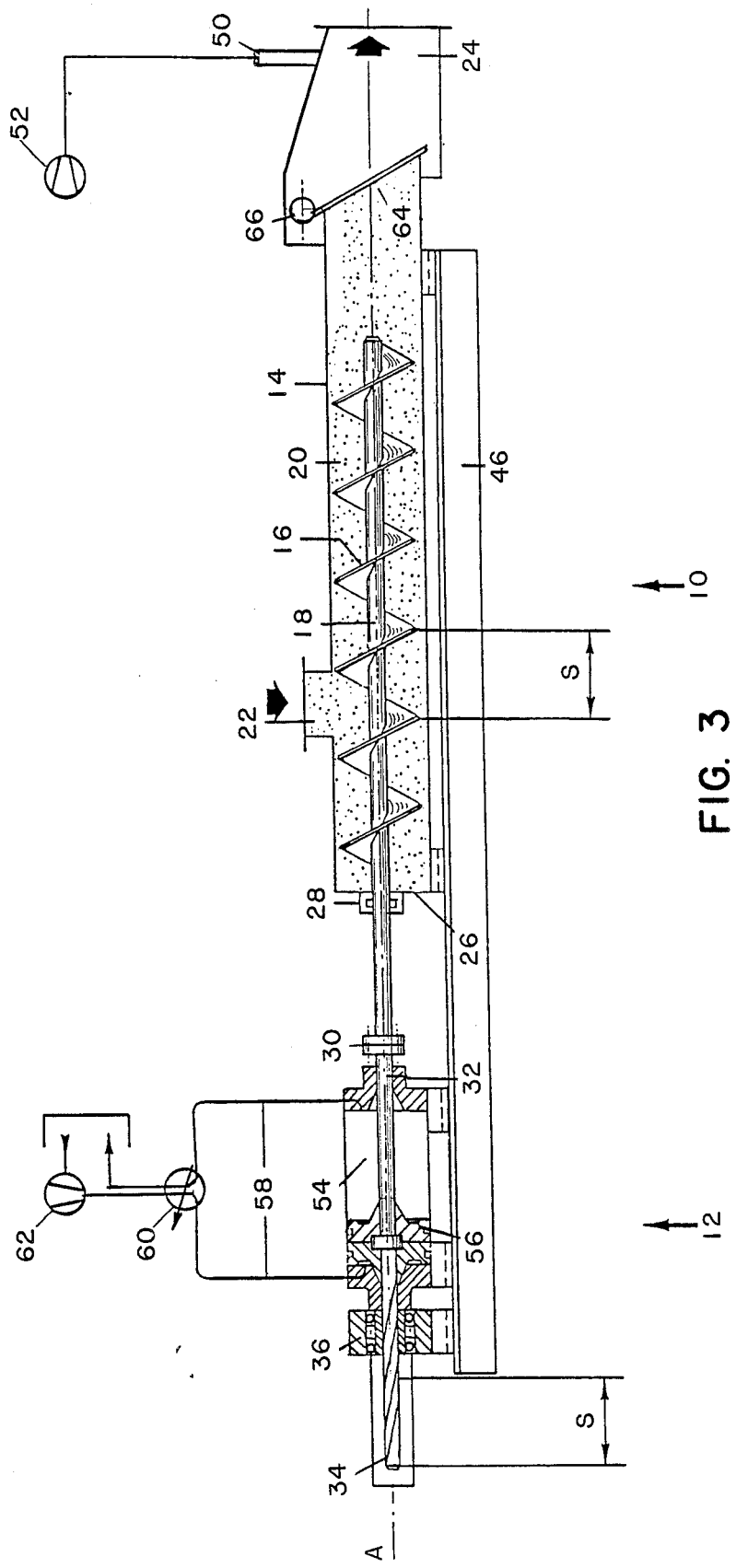

FIG. 3: A conveyance device with pneumatic drive which is employed as self-sealing feed facility in a feeder stream.

Figure 4:
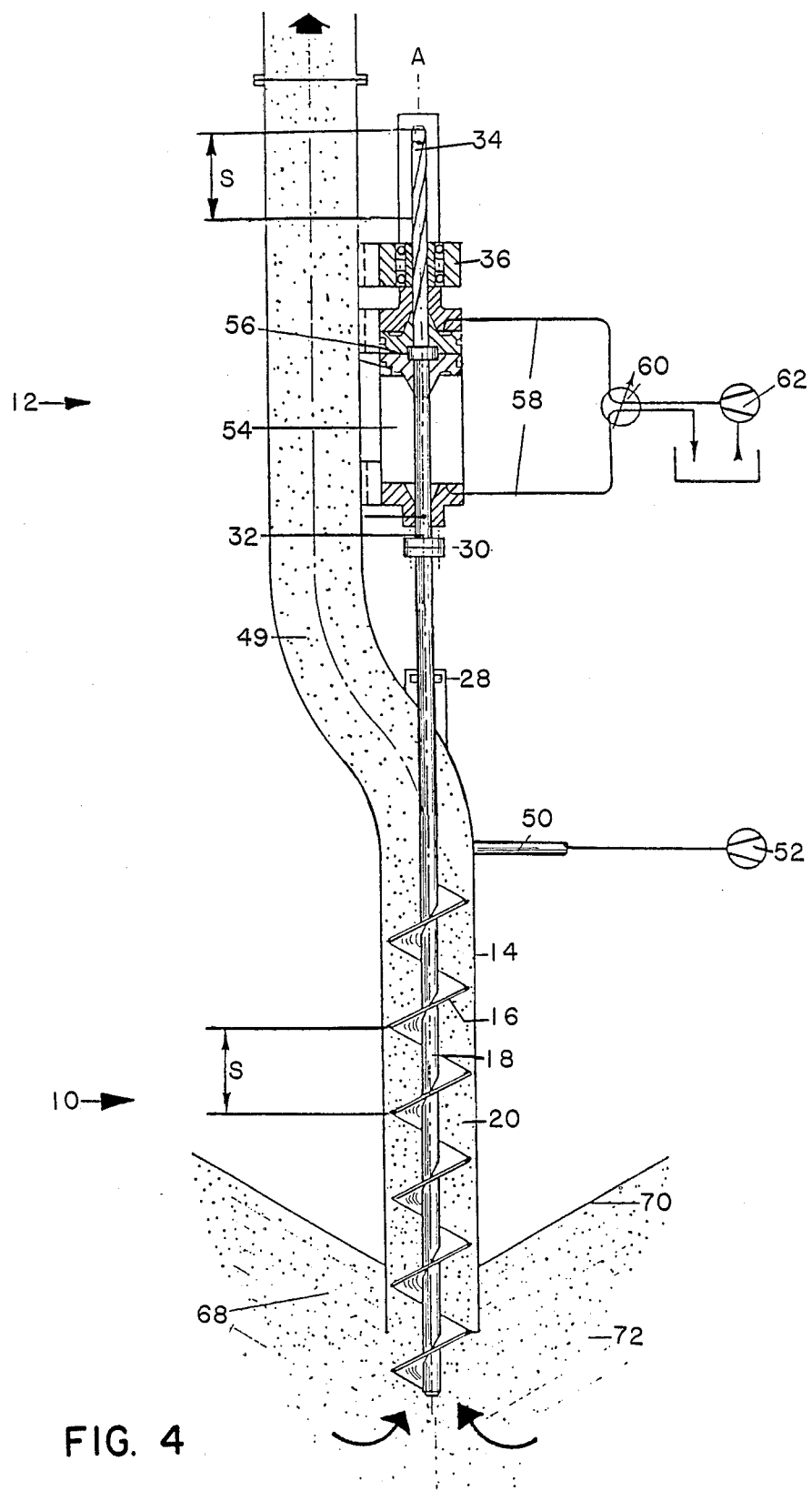

FIG. 4: A conveyance device as in FIG. 2 or 3 but with vertical feeder screw which independently removes particulate material from heaped feedstock.

The device for transporting flowable material shown in FIG. 1 comprises essentially a conveyance region 10 and a drive region 12.

Situated in the conveyance region 10 in a feed pipe 14 is a feeder screw 16 that can be moved backwards and forwards along its axis A. The blades of the feeder screw 16 are welded to a screw shaft 18 and their distance from the inner wall of the feed pipe 14 is larger than the average grain size of the particulate material 20. The stroke of the feeder screw 16 on its forward movement is in the case of this version slightly less than the pitch s of the screw.

The particulate material 20 is introduced without measured feeding into inlet 22 indicated here by an arrow. As a forward stroke takes place, the feeder screw 16 which, with respect to the material 20, is self-restricting is pushed forward, without rotating. This causes a corresponding amount of material 20 to be pushed into the outlet 24 and led off for further use, also indicated by an arrow. The exit 24 is flanged onto the feed pipe 14.

The feed pipe 14 is closed off at the rear end with respect to the direction of feed by an end wall 26 through which the shaft 18 passes. Attached to this end wall 26 is a seal 28 on which the screw shaft 18 can slide.

Via coupling 30 a screw shaft 18 is rigidly attached to a drive shaft 32 that is positioned in the same axial direction A and is driven via coupling 35 by a synchronous motor, not shown here.

The forward and backward movement of the drive shaft 32 is effected by an electromechanically powered disc 38 with cam 40 that engages on a connecting rod 42 acting on the driveshaft 32.

The housing 44 and the feed pipe 14 are attached to a common bracket 46.

The feeding facility, shown in FIG. 2, for introducing particulate material into a feeder stream corresponds in the conveyance region 10 essentially with that shown in FIG. 1. The outlet for the material is however not in the form of a gravity feed pipe but as a conically tapering intermediate piece 48 which is flanged on to the feed pipe 14 and, at its other end, is flanged on to conveyance pipe 49. Connecting up with the intermediate piece 48 is a supply pipe 50 for propellant, through which pipe 50 in the present case air that has been brought to high pressure by a compressor 52 is blown into the system. The particulate material introduced into the intermediate piece 48 by the forward stroke for the feeder screw 16 is carried away by the stream of air.

The pressure of the propellant produces an enormous counter pressure in the interior of the feed pipe 14 in the conveyance region 10. The feed pipe 14 which is completely filled with particulate material 20 in the region of the feeder screw 16 ensures that the conveyance region is self-sealing. In the region of the inlet 22 for the material 20 the pressure of the propellant falls to a few percent.

Via coupling 30 the screw shaft 18 is rigidly attached to the drive shaft 32 which lies on the same axis A and in its rearmost region is in the form of a rod 34 with multi-gear threading. The guide screw of this threaded rod has the same pitch s as the feeder screw 16 and engages on the nut of a return stop 36. The return stop 36 allows the nut to rotate freely during the forward stroke, but is blocked during the return movement of the shaft and so forces the threaded rod to rotate and with it the drive and feeder screw shaft. A precondition is that the diameter of the threaded rod 34 is chosen of such a dimension that no self-restriction occurs. As the pitch s is the same on the threaded rod 34 and on the feeder screw 16 on the return stroke the latter rotates through the particulate material 20 without causing it to move parallel to the axis A.

In the drive region the application of pressure in the axial direction for the forward and backward movement of the feeder screw 16 takes place via a piston 56 which is moved forwards and backwards in the drive cylinder 54 by means of hydraulic pressure. The drive shaft can rotate freely in the piston 56. After the piston, the drive shaft 32 connects up with the threaded rod 34. During the return movement the threaded rod 34 and the drive shaft 32 rotate; the piston 56 on the other hand does not.

The hydraulic oil, controlled via a reversing valve 60 which is actuated in a conventional manner by two end switches, and driven by a pump 62, is led via inlet and outlet lines 58 alternately to one side of the drive cylinder.

FIG. 3 differs from FIG. 2 in only two respects. The first which is easily recognizable from the drawing lies at the outlet end 24. The feed pipe 14 is closed off there by an inclined spring-back flap 64 which can be tilted about an axis 66. As the feeder screw 16 is advanced, flap 64 is raised by the material 20 flowing out, but is quickly pushed down again by the compressed air. This improves the self-sealing function of the conveyance device which is an advantage especially with material in the form of coarse particles or lumps.

Further, but not seen in FIG. 3, is that the pressure in the axial direction A is achieved using compressed air.

According to the version shown in FIG. 4 both the conveyance and drive regions, suspended by means of a crane not shown here, are vertical or almost vertical. The feeder screw 16, which projects out of the feeder pipe 14 at least before the advance stroke, independently removes particulate material 20 from a heap 68, for example from a ship's hold. As a result the aluvial cone 70 is formed. The lines of material flow 72 are also shown. The particulate material 20 is transported upwards vertically or almost vertically and conveyed further in a tube-shaped conveyance pipe 49 by means of compressed air which is introduced via pipe 50.

What is claimed is:

1. Device for the transportation of flowable material in powder, particulate, lump, granular or pasty form which comprises a feed pipe having an inner wall, a coaxial feeder screw coated with a substance having good sliding properties within said feedpipe, means for driving said feeder screw and a drive shaft rigidly coupled to said feeder screw, wherein said feeder screw can be moved backwards and forwards in the axial direction (A), and the means for driving produces a rotation-free forward stroke and a return movement with forced, regular rotation of the feeder screw per screw pitch length (s) is situated in line with the feeder screw, and wherein the feeder screw features no bearings within the flowable material in the feed pipe, includes blades thereon which are continuous and the distance of the feeder screw from the inner wall of the feed pipe is on all sides just slightly larger than the average particle or lump size of the flowable material being transported, whereupon in the presence of a pneumatic or hydraulic counter-pressure a compact, homogenous column of material is produced further including means for admitting a conveyance stream of gaseous or fluid propellant downstream to said feeder screw, such that the length of the feed pipe is of such a size that the pressure from the propellant at the entry of the material into the feeder screw is only a small fraction of the value it has in the conveyance stream, whereby said device provides a self-sealing facility wherein said feed pipe has an end wall with an opening therein, a seal is provided outside the opening of the end wall of the feed pipe and including a feeder screw shaft which passes through said end wall opening, said feed pipe having an exit including a spring back flap means provided on the feed pipe at the exit.

2. Device according to claim 1 wherein the feed pipe and the feeder screw are of the same material.

3. Device according to claim 2 wherein the feed pipe and the feeder screw are of stainless steel.

4. Device according to claim 1 wherein said substance can be heated.

5. Device according to claim 1 wherein said substance can be cooled.

6. Device according to claim 1 wherein the feeder screw can be heated.

7. Device according to claim 1 wherein the feeder screw can be cooled.

8. Device according to claim 1 including means for holding said flowable material in communication with said feed pipe.

* * * * *